Patented Mar. 12, 1940

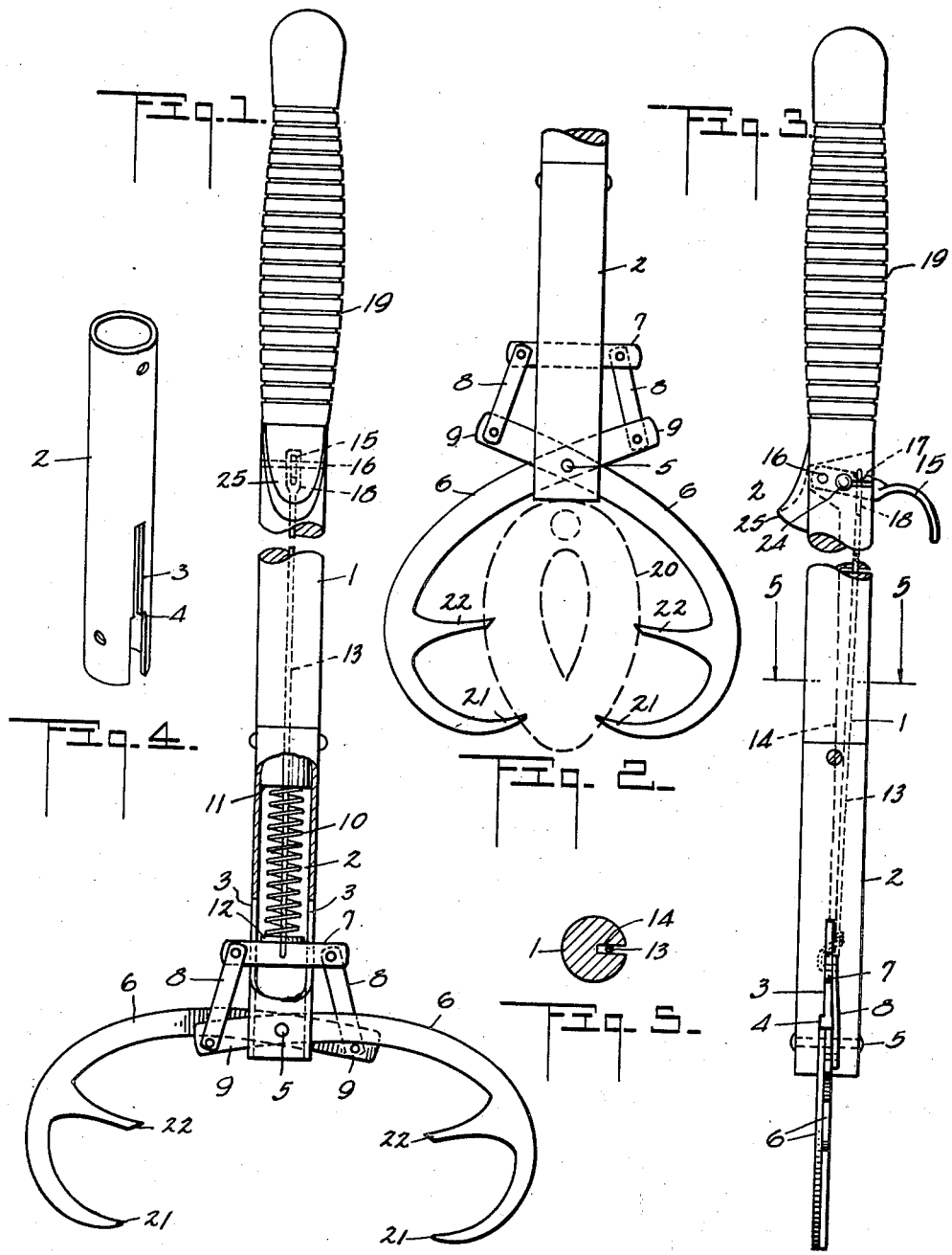

2,193,073

UNITED STATES PATENT OFFICE 2,193,073

GAFF HOOK

John S. Norton, San Francisco, Calif.

Application January 3, 1939, Serial No. 249,075

2 Claims. (Cl. 43—5)

The present invention relates to improvements in gaff hooks used for landing fish, and its principal object is to provide a device of the character described, which will grip the entire body of the fish from opposite sides, and thus greatly facilitating the landing of the fish by insuring a firmer hold at a more advantageous point near the central portion of the body of the fish.

It is further proposed to use a landing device of the character described in which two cooperating hooks are provided at one end of a pole or handle for gripping the body of the fish and operating means at the other end of the handle for causing the hooks to close on the body of the fish at the proper time.

It is further proposed to use hooks of particular construction, which will reach almost around the body of the fish, and which are provided with two spurs for gripping the body of the fish simultaneously at an intermediate portion of the body and from below, and shaped so as to firmly confine the fish in the space defined by the two hooks.

Further objects and advantages of my invention will appear as the specification proceeds.

The preferred form of my invention is illustrated in the accompanying drawing in which:

Figure 1 shows a side elevation of my invention, a portion being broken away and parts being shown in section;

Figure 2 a fragmentary detail view showing the hooks in gripping position;

Figure 3 a side elevation taken at right angles to that of Figure 1;

Figure 4 a perspective detail view of a sleeve used as part of the handle, and

Figure 5 a cross-section taken along line 5—5 of Figure 3.

While I have shown only the preferred form of my invention, I wish to have it understood that various changes or modifications may be made within the scope of the claims hereto attached without departing from the spirit of the invention.

Referring to the drawing in detail, my device comprises a suitable handle 1, which is preferably straight and about two and one-half feet in length, and which terminates, at its lower end, in a sleeve 2 having diametrically opposite longitudinal slots 3 in the end thereof. The slots are preferably stepped, as at 4, so as to be wider at their outer ends.

In the wider portions of the slots are pivotally mounted, as at 5, two overlapping hooks 6, and the narrower portions of the slots accommodate a transverse sliding bar 7, the ends of which project beyond the sleeve and are connected, by means of links 8, to correspondingly projecting operating ends 9 of the hooks. A spring 10 within the sleeve bears on the end of the solid portion of the handle, as at 11, and, through a washer 12, on the cross-bar 7 to urge the same outwardly and to thereby urge the hooks into wide open position as shown in Figure 1.

A rod or wire 13 is connected to the cross-bar 7 at one end and extends through the sleeve 2 and a deep longitudinal groove 14 cut into the handle for connection to an intermediate portion of a trigger 15 pivotally mounted in the upper portion of the handle, as at 16.

The upper portion of the trigger is notched, as at 17, (see Figure 3), to receive a loop 18 formed in the upper end of the rod 13.

The handle extends somewhat beyond the trigger and is formed with a suitable hand hold, as at 19, and if the trigger is pulled upward by a person gripping the hand hold, the hooks are drawn together, as shown in Figure 2 to impinge upon the body of a fish, the outlines of which are indicated at 20.

The hooks are of peculiar formation, as shown in the figures of the drawing, and are curved substantially along the lines of a parabola to form terminal spurs 21, which turn slightly inwardly from the parabolic line. When the spurs engage the body of a suitably sized fish, as in Figure 2, they grip the lower body portion of the fish from opposite sides and have a tendency to urge the fish upwardly toward the bottom end of the sleeve.

In addition to the terminal spurs, I provide a set of intermediate spurs 22, which project inwardly from an intermediate portion of the hook curve and which in their extremities may substantially parallel the terminal spurs. The length of the intermediate spurs is preferably such that a line connecting the tips of the two spurs at each hook strikes the hook shank substantially at the beginning of the hook curvature.

The intermediate spurs will strike the body of the fish substantially in the center, as shown in Figure 2, and they also have a tendency to lift the fish body toward the handle so that the fish is firmly held at five points in normal operation. The intermediate spurs may be used also in gripping smaller fish than the one illustrated.

It will be noted that when the hooks are in open position, as in Figure 1, the spacing between the terminal spurs exceeds the spacing between the intermediate spurs, which allows the hooks to be readily lowered upon the body of the fish. When the hooks are closed in upon the fish, the spacing between the terminal hooks is less than that between the intermediate spurs, which allows all the spurs to become active on the body of the fish substantially at the same time.

The operation of my device should be readily understood from the foregoing description. As the fish is drawn toward the boat, shore or the like from which the fisherman operates, the latter takes up the handle, guides the hooks to position them over the body of the fish and then pulls the trigger, whereby the spurs are made to engage with the sides of the fish body in the manner shown in Figure 2 and to firmly grip the fish.

In case it is desired to hold the trigger in active position, a small slide 24 may be provided to slide underneath the trigger when the latter is pulled upward, and a suitable thumb rest 25 may be provided on the handle in opposing relation to the trigger.

I claim:

1. In a device of the character described, a handle having a sleeve at one end thereof, the sleeve having registering longitudinal slots, a cross member extending at substantially right angles to the sleeve and being movable in the slots and having its ends projecting beyond the sleeve, a pair of hooks pivoted in the end of the sleeve in cooperative relation for opening and closing movements, means connecting the shank ends of the hooks to the projecting ends of the cross member, spring means confined within the sleeve and bearing directly upon the lower end of the handle and the central portion of the cross member for urging the cross member in one direction to spread the gripping ends of the hooks apart, and manually operable means for moving the cross member in the opposite direction for drawing the gripping ends of the hooks toward each other to grip an object therebetween.

2. In a device of the character described, a handle having a hand grip at its upper end and a thumb rest extending lengthwise of the handle to be engaged by a person's thumb when grasping the hand grip, a lever pivoted to the handle and extending from the handle on the side opposite the thumb rest to be engaged by the person's index finger, a pair of hooks pivoted to the lower end of the handle in cooperative relation for opening and closing movements, yielding means urging the gripping ends of the hooks to spread apart, and means connecting the hooks with the lever, whereby manual movement of the latter will effect a closing movement of the hooks to grip an object.

JOHN S. NORTON.